Patented Jan. 23, 1951

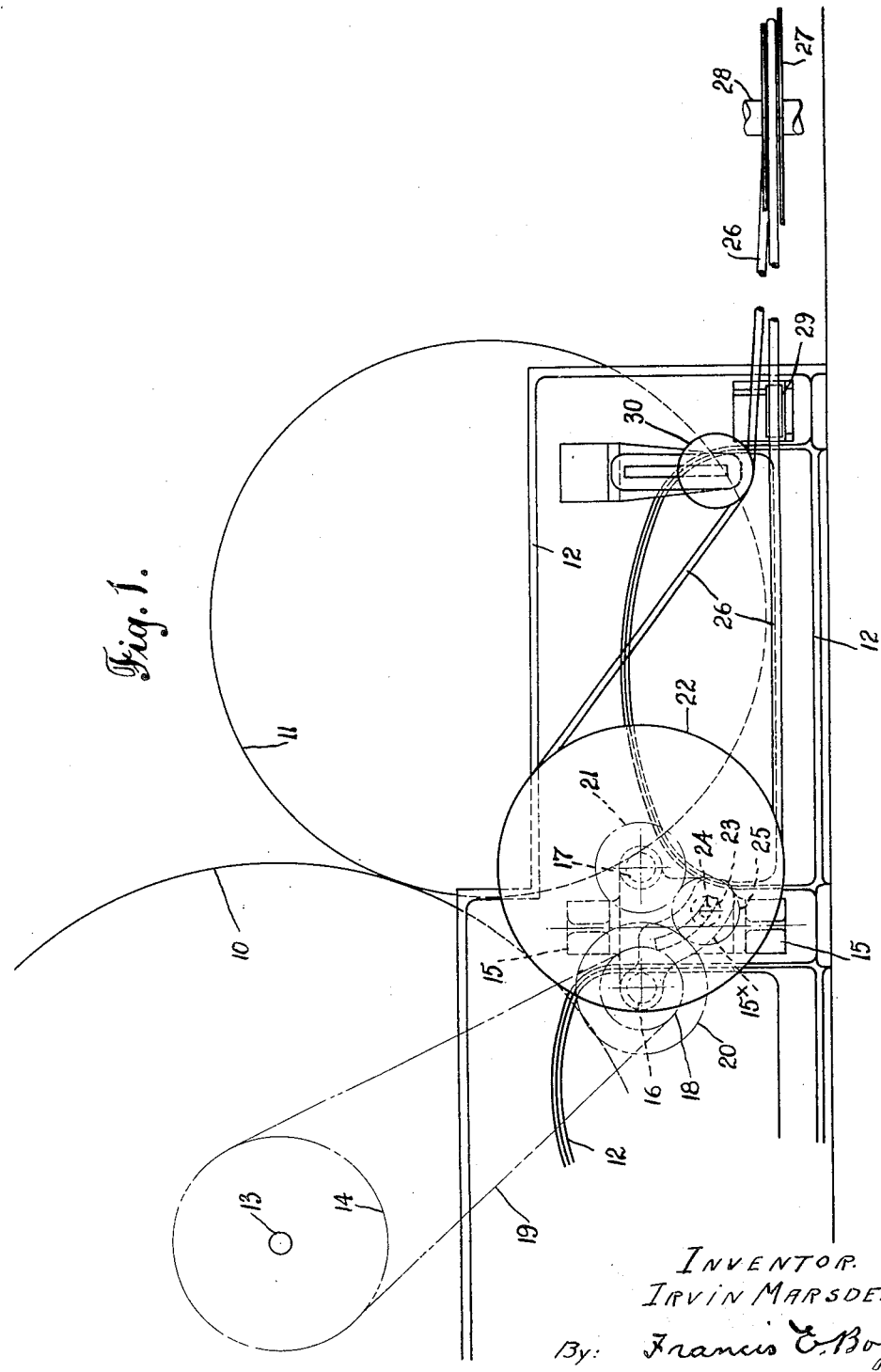

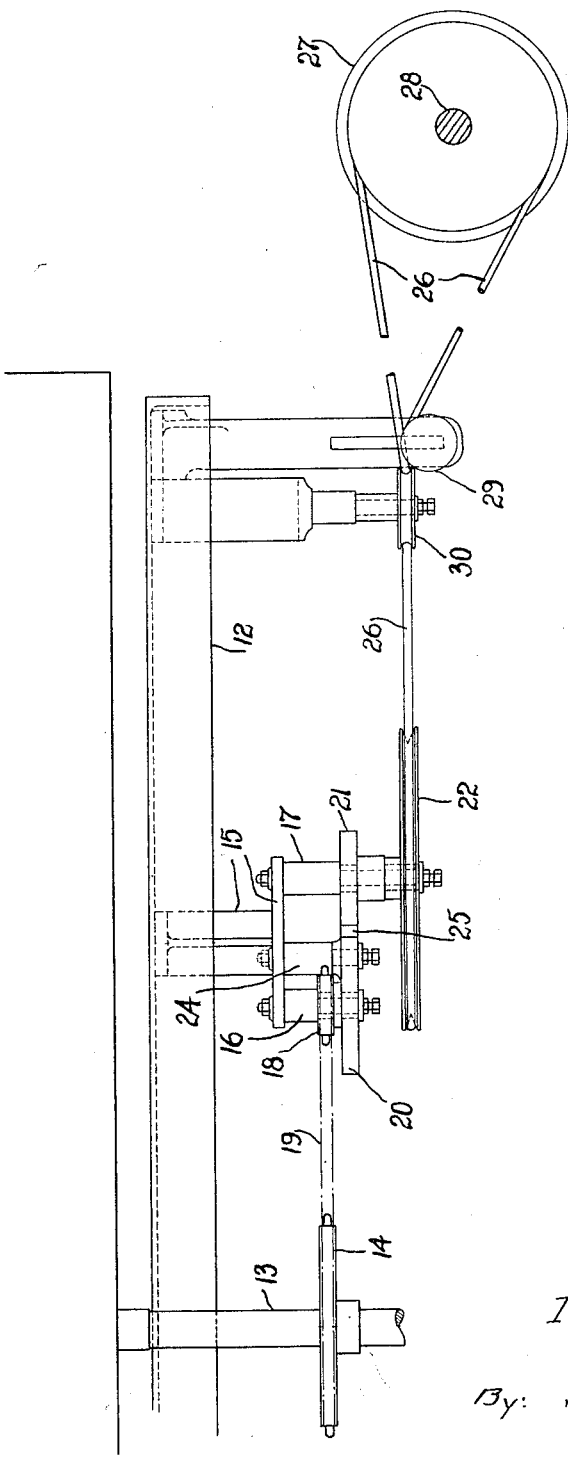

2,539,028

UNITED STATES PATENT OFFICE 2,539,028

DRIVING MECHANISM FOR THE RUBBING MOTION OF TAPE CONDENSERS OF CARDER ENGINES

Irvin Marsden, Horsforth, Leeds, England, assignor to Platt Brothers & Company Limited, Oldham, England, a British company Application December 28, 1944, Serial No. 570,083
In Great Britain January 4, 1944

3 Claims. (Cl. 74—325)

This invention relates to improvements in the driving mechanism for the rubbing motion of tape condensers of carder engines and the like for woollen, waste and other textile fibres.

At present the drive for the rubbing motion takes place by means of a rope pulley mounted on the cylinder shaft, the driving rope being carried down through carrier pulleys and jockey pulleys to a grooved pulley mounted on the rubbing motion shaft. The pulley on the rubbing motion shaft usually has two grooves of different diameters, and the rope is changed from one to the other to effect a change of speed of the rubbing motion shaft. It is seen that the change of speed is limited.

It is desirable in the trade that the speed of the rubbing motion of tape condensers should be capable of greater variation, and the object of the present invention is to provide a variable speed driving mechanism for the rubbing motion of such tape condensers whereby the speed of the driving shaft for said motion can be varied at will.

According to the present invention, a driving mechanism for the rubbing motion of tape condensers of carder engines for textile fibres comprises a change speed gear mounted on the frame of the engine, driving means from the engine to the input of the said change-speed gear, and a driving coupling between the output of the gear and the driving shaft of the rubbing motion.

A preferred embodiment of the driving mechanism according to the invention is now described with reference to the accompanying drawings, wherein:

Fig. 1 is an elevation of the improved driving mechanism attached to the framework of the carder engine, whilst Fig. 2 is a plan view.

In said drawings, there is illustrated only so much of the carder engine and tape condenser as is requisite to indicate the disposition and operation of the improved driving mechanism, and as shown the main cylinder of the carder engine is marked 10, the doffer 11, and the carder engine framework 12. On the cylinder shaft 13 is mounted a driving chain pulley 14 for the improved driving mechanism. A shaped supporting bracket 15 is attached to the framework 12, and in said bracket are fixed a pair of stud shafts 16, 17, the shaft 16 being the input shaft of the change speed gear, and 17 the output shaft. On the shaft 16 is rotatably mounted a chain pulley 18 which is connected to the chain pulley 14 by a chain 19. The chain pulley 18 has an extended bush, and on said bush is mounted, so as to be rotatable therewith, a change gear wheel 20 of catch box or other type. This gear wheel 20 is capable of being easily and quickly removed from or mounted on said extended bush. A gear wheel 21 also having an extended bush is revolvably mounted on the shaft 17, and said gear wheel 21 is in alignment with the gear wheel 20. On the extended bush of the gear wheel 21 is mounted a grooved rope pulley 22, the arrangement being such that the gear wheel 21 and grooved rope pulley 22 rotate together. A quadrant 15$^\times$ forming part of the bracket 15 has a slot 23 arcuate about the shaft 17 cut therein, and a stud shaft 24 is disposed in said slot, and having means whereby the said shaft can be released and moved to any position in the slot, and secured in position after adjustment. Revolvably mounted on the stud shaft 24 is an idler pinion 25 which meshes with the two gear wheels 20, 21. It will be appreciated that the idler pinion 25 is constantly in mesh with the gear wheel 21.

A rope 26 provides the driving connection between the rope pulley 22 and a rope pulley 27 mounted on the vertical rubbing motion shaft of the tape condenser, a portion of such shaft being shown in the drawings and marked 28.

When it is desired to vary the speed of rotation of the shaft 28 and consequently the frequency of the oscillating side movement imparted to the rubber of the tape condenser, all that is required is to remove gear wheel 20 from the extended bush of the chain pulley 18, and substitute a fresh gear wheel having more or less teeth according to requirements. The stud shaft 24 is adjusted in the slot 23 to allow for the exchange of gear wheels, and is locked in position after said adjustment.

In this manner it is possible to arrange for a considerable range of speeds to be imparted to the rubbing motion shaft.

As the rope drive is much shorter, there is less wear. Further, an endless rope can be supplied with the machine. A jockey pulley 30 and guide pulley 29 are provided to tension and guide the rope drive.

The improved driving mechanism enables an operative to select the best speed for the rubbing motion shaft to meet the variations in the quality and kind of fibre being acted upon, and also to meet any variations desired in the frequency of rubbing, and a much better roving results.

Other types of change speed gears may be utilised without departing from the scope of the present invention.

What I claim is:

1. In a carder engine for textile fabrics having a condenser with rubbing motion, a part fixedly secured to the frame of the engine at one side thereof provided with an arcuate slot means between said carder engine and the condenser for transmitting motion to said rubbing motion, said means comprising gearing supported on the frame of the engine at the side thereof at which said part is positioned and including a pair of gear wheels disposed in radial alinement but out of mesh with each other, one of said gear wheels being mounted for ready removal for substitution of a gear wheel of different diameter, a pinion disposed between said gear wheels in mesh with both, said pinion being mounted on a shaft removably secured in said arcuate slot whereby the axis of the pinion may be moved thereby to bring the pinion into mesh with gear wheels of different diameters, a chain and sprocket drive between the cylinder shaft of the carder engine and one of said gear wheels, and a belt and pulley drive between the other gear wheel and said rubbing motion.

2. In a carder engine for textile fabrics having a condenser with rubbing motion, a supporting bracket secured to the frame of the engine at one side thereof, a pair of shafts carried by said bracket in parallel relation to each other, a gear wheel mounted for rotation on each of said shafts, said gear wheels being disposed in radial alinement with each other, a slotted quadrant fixedly secured to said bracket, a stud shaft removably secured in the slot of said quadrant, a pinion mounted for rotation on said stud shaft and disposed in position to mesh with both of said gear wheels, one of said gear wheels being removable for substitution of a gear wheel of different diameter, driving means from the carder engine to one of said gear wheels, and driving means from the other gear wheel to said rubbing motion.

3. In a carder engine for textile fabrics including a condenser with rubbing motion having a vertical shaft forwardly of the carder engine frame, a driving chain pulley on one end of the engine cylinder shaft at one side of the engine frame, a rope pulley fixed on said rubbing motion shaft, a supporting bracket on the engine frame at the same side thereof at which said driving chain pulley is positioned, a pair of shafts carried by said bracket in parallel relation to each other, a gear wheel mounted for rotation on each of said shafts, said gear wheels being in radial alignment with each other, one of said gear wheels being removable thereby to permit substitution of a gear of different diameter, a chain pinion mounted on the shaft of said last mentioned gear wheel and fixed to the latter, a rope pulley on the shaft of the other gear wheel and fixed to the latter, a pinion mounted on a shaft on the engine frame disposed to mesh with both of said gear wheels, the shaft of said pinion being shiftable thereby to bring said pinion into mesh with gear wheels of different diameters, a driving chain connecting the chain pinion fixed to said removable gear with the chain pinion on the engine cylinder shaft, and an endless driving rope connecting the rope pulley fixed to the other of said gears with the rope pulley on the rubbing motion shaft.

IRVIN MARSDEN.

REFERENCES CITED

The following references are of record in the file of this patent:

UNITED STATES PATENTS

| Number | Name | Date |
|---|---|---|
| 1,352,925 | Thiel | Sept. 14, 1920 |
| 1,505,427 | Reeves | Aug. 19, 1924 |
| 2,053,795 | Keith et al. | Sept. 8, 1936 |
| 2,174,167 | Rattray | Sept. 26, 1939 |
| 2,237,466 | Zimmerman | Apr. 8, 1941 |

FOREIGN PATENTS

| Number | Country | Date |
|---|---|---|
| 11,795 | Great Britain | 1899 |